United States Patent
Lu et al.

(10) Patent No.: US 10,632,729 B2
(45) Date of Patent: Apr. 28, 2020

(54) 3D PRINTING METHOD IMPLEMENTED BY SWATHS AND PRODUCT FROM THE METHOD

(71) Applicants: XYZPRINTING, INC., New Taipei (TW); KINPO ELECTRONICS, INC., New Taipei (TW)

(72) Inventors: Ting-Yu Lu, New Taipei (TW); Ching-Hua Su, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 426 days.

(21) Appl. No.: 15/403,189

(22) Filed: Jan. 11, 2017

(65) Prior Publication Data

US 2018/0111333 A1    Apr. 26, 2018

(30) Foreign Application Priority Data

Oct. 24, 2016 (CN) .......................... 2016 1 0933105

(51) Int. Cl.
*B33Y 10/00* (2015.01)
*B29C 64/112* (2017.01)
(Continued)

(52) U.S. Cl.
CPC ............ *B33Y 10/00* (2014.12); *B29C 64/112* (2017.08); *B29C 64/386* (2017.08); *B33Y 50/02* (2014.12);
(Continued)

(58) Field of Classification Search
CPC ....... B33Y 10/00; B33Y 80/00; B29C 64/112; B29C 64/386
(Continued)

(56) References Cited

U.S. PATENT DOCUMENTS

| 2010/0033521 | A1 | 2/2010 | Kritchman | |
|---|---|---|---|---|
| 2014/0291893 | A1* | 10/2014 | Hopkins | G05B 19/4099 264/308 |
| 2016/0192741 | A1 | 7/2016 | Mark | |

FOREIGN PATENT DOCUMENTS

| WO | 2016138345 A1 | 9/2016 |
|---|---|---|
| WO | 2016167239 A1 | 10/2016 |

OTHER PUBLICATIONS

Search Report dated Jul. 18, 2017 of the corresponding European patent application No. 17157084.9.
(Continued)

*Primary Examiner* — Christina A Johnson
*Assistant Examiner* — Xue H Liu
(74) *Attorney, Agent, or Firm* — Chun-Ming Shih; HDLS IPR Services

(57) ABSTRACT

A 3D printing method implemented by swaths is disclosed. When printing swaths of a printing layer, a 3D printer first obtains a default swath-width, and adjusts the default swath-width based on a shift value, then controls a nozzle to print the swaths according to the adjusted swath-width. When printing a final swath of the same printing layer, the 3D printer compensates a remained swath-width of the final swath according to the adjusted shift value(s) of previous printed swath(s), and controls the nozzle to print the final swath according to the compensated remained swath-width. When printing different printing layers, the 3D printer uses different shift values to adjust the swath-width of each printing layer. Because swaths of different printing layers have different widths, the positions of seams between each two swaths of each printing layer are staggered, and thus the strength of printed 3D models is enhanced.

13 Claims, 6 Drawing Sheets

(51) Int. Cl.
   *B29C 64/386*    (2017.01)
   *B33Y 50/02*     (2015.01)
   *B33Y 80/00*     (2015.01)
   *B29K 105/00*    (2006.01)

(52) U.S. Cl.
   CPC ...... *B33Y 80/00* (2014.12); *B29K 2105/0058* (2013.01)

(58) Field of Classification Search
   USPC ........................................................ 264/308
   See application file for complete search history.

(56) References Cited

OTHER PUBLICATIONS

Office Action dated Jun. 18, 2019 of the corresponding Japan patent application No. 2017-048700.

\* cited by examiner

3D PRINTING METHOD IMPLEMENTED BY SWATHS AND PRODUCT FROM THE METHOD

BACKGROUND OF THE INVENTION

Field of the Invention

The present invention relates to 3D printing methods, in particular relates to a 3D printing method implemented by swaths and product from the 3D printing method.

Description of Related Art

A 3D ink-jet printer reads a 3D graphic file input by a user, and performs ink-jetting to stack a corresponding 3D model, which is convenient to operate.

Refer to FIG. 1, FIG. 1 is a schematic diagram of a related art 3D printer. Specifically, a 3D ink-jet printer 1 (referred as the printer 1) comprises a nozzle 11 and a printing platform 12. As shown in FIG. 1, the nozzle 11 is a wide nozzle, and installed with a plurality of spray pores. When the printer 1 controls the nozzle 11 to print, the nozzle 11 simultaneously sprays a row of ink droplets via the plurality of spray heads so as to print a row of printing dots on the printing platform 12. The quantity of the printing dots is determined by a swath-width set up for the nozzle 11 (as the swath-width S shown in FIG. 2), and the quantity does not exceed the width of the nozzle 11.

FIG. 2 and FIG. 3 are respectively a swath top view diagram of the related art 3D printer and a 3D model cross section diagram of the related art 3D printer. The nozzle 11 is set with a determined width. During printing, the printer 1 controls the nozzle 11 to move towards X-axis, thus the nozzle 11 prints a swath 21 on the printing platform 12. Specifically, the printing dots quantity in the swath 21 on Y-axis is determined by the swath-width S, and the printing dots quantity in the swath 21 on X-axis is determined by the moving distance of the nozzle 11 from the printing platform 12.

In order to complete the printing of a 3D model product 4 within the shortest time, the swaths 21 is configured with the largest swath-width S possible in the printer 1. Generally speaking, the maximum of the swath-width S approximately equals to the width of the nozzle 11. Accordingly, the printer 1 uses the least number of prints to cover the entire printing platform 12. In the embodiment in FIG. 2, three swaths 21 are required to cover a platform width W of the printing platform 12. In other words, the printer 1 only needs to print three swaths 21 (generally referred as three prints) to complete the printing of a printing layer 2 of the 3D model product 4.

As shown in FIG. 3, a 3D model product 4 is comprised of a plurality of printing layers 2, and each of printing layer 2 is respectively comprised of a plurality of the swaths 21 (for example, three swaths 21 shown in FIG. 3). When the printer 1 prints a swaths 21, the printer 1 recognize the width end point of the last swath 21 as the width start point of the next swath 21. Accordingly, a seam 3 is generated between two swaths 21.

In the related art, the printer 1 prints the swaths 21 of each printing layer 2 with the same swath-width S. As shown in FIG. 3, the positions of the seams 3 between swaths 21 on each printing layer 2 are the same. Accordingly, in a printed 3D model product 4, the seams 3 between printing layer 2 form one or several contacting lines.

According to the experiments of the inventors of the present invention, when the 3D model product 4 generated by printing with associated related art was squeezed by external forces, the 3D model product 4 is prone to crack along the contacting lines, which indicates that the strength of the 3D model product 4 is insufficient. It is desired to improve the printing method adapted in the related art.

SUMMARY OF THE INVENTION

The present invention provides a 3D printing method implemented by swaths and product from the method, wherein the positions of the seams between each two swaths on different printing layers are staggered for reinforcing the strength of the printed 3D model product.

In a disclosed embodiment, when a 3D printer prints each swath of a printing layer, the 3D printer first obtains a default swath-width, then adjusts the default swath-width based on a shift value, then controls a nozzle to print the swaths according to the adjusted swath-width.

When printing a final swath of the same printing layer, the 3D printer compensates a remained swath-width of the final swath according to the adjusted shift value of the printed swaths, and then controls the nozzle to print the final swath according to the compensated remained swath-width. When printing different printing layers, the 3D printer uses different shift values to adjust the swath-width of each printing layer.

Compare to related art, the technical advantage provided by the disclosed example is that: when the 3D printer prints each printing layer, the swaths are printed with different swath-widths, and the positions of seams between each two swaths of each printing layer are staggered. Accordingly, the printed 3D model product has higher strength, which does not crack along the seams when external forces apply.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
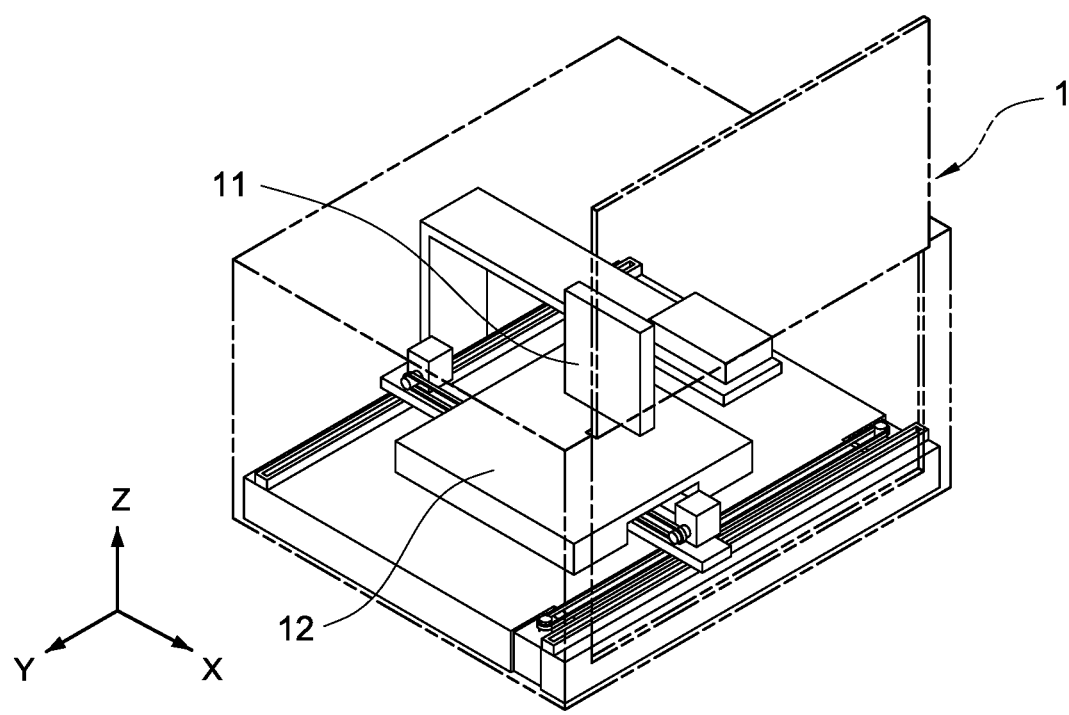
FIG. 1 is a schematic diagram of a related art 3D printer.

In cooperation with attached drawings, the technical contents and detailed description of the disclosed example are described thereinafter according to a preferable embodiment, being not used to limit its executing scope. Any equivalent variation and modification made according to appended claims is all covered by the claims claimed by the present invention. A 3D printing method implemented by swaths (referred as the printing method below) is disclosed. The printing method is used with the printer 1 described in the above-mentioned FIG. 1. As shown in FIG. 1, the printer 1 comprises a wide nozzle 11 and a printing platform 12. The nozzle 11 once sprays a row of ink droplets via a plurality of spray heads, and prints swaths on the printing platform 12 along with the relative movement between the nozzle 11 and the printing platform 12 to generate a 3D model product (for example, the 3D model product 7 shown in FIG. 8).

Specifically, the disclosed example is applicable to any printer that comprises a wide nozzle, and once sprays a row of droplets (ink droplets or adhesives droplets etc.) via the wide nozzle. Therefore, the printer 1 may be a 3D jet printer according to the disclosed example or a 3D powder-bed printer etc. and is not limited thereto.

Figure 7:
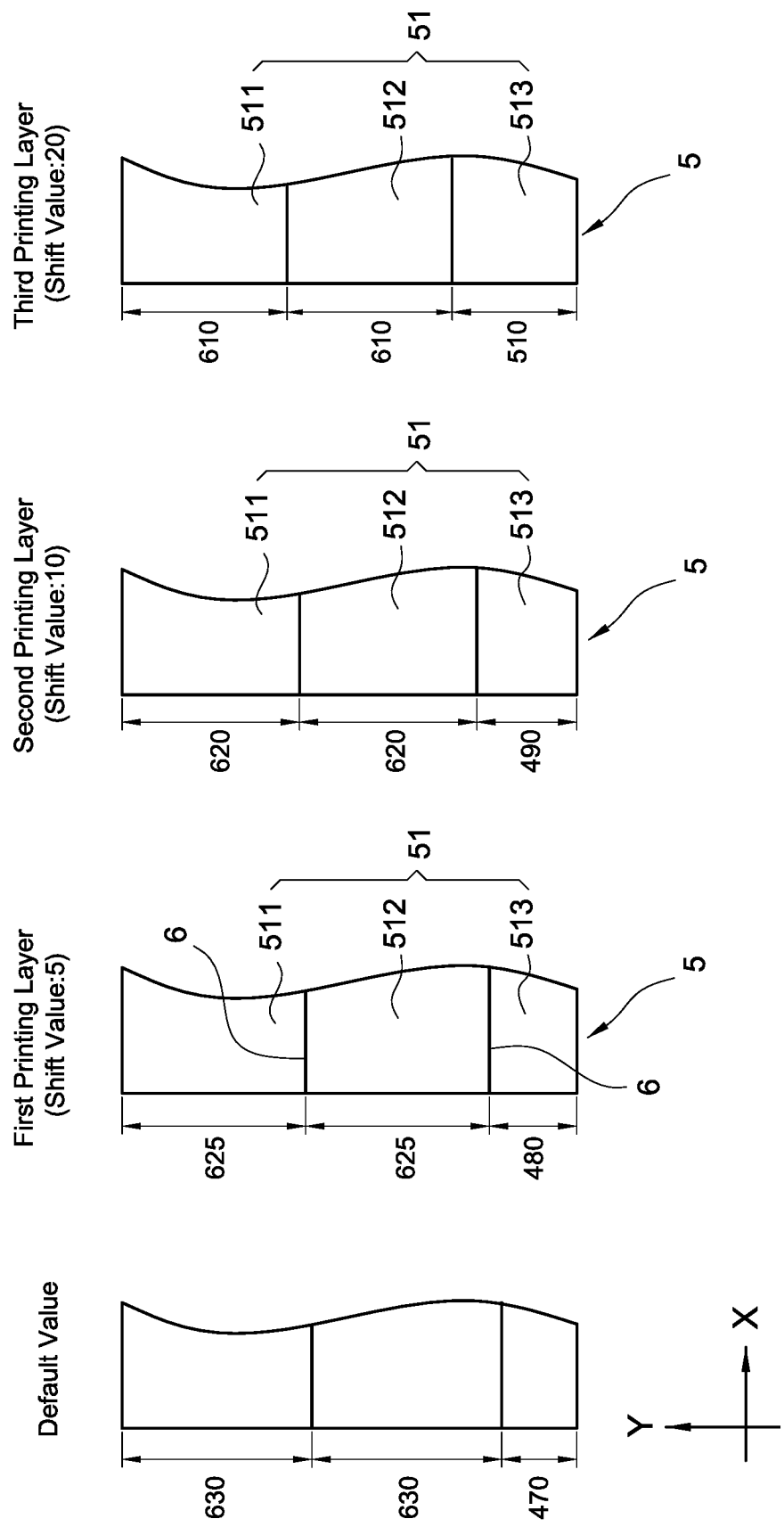
FIG. 7 is a swath top view diagram according to the first disclosed embodiment.

When printing the 3D model product 7, the printer 1 prints several swaths side by side on the printing platform 12 (as the swaths 51 shown in FIG. 7). The swaths 51 form a printing layer (as the printing layer 5 shown in FIG. 7). Also, several printing layers 5 are stacked through changing the gap between the nozzle 11 and the printing platform 12, so as to generate a complete 3D model product 7. In other words, when printing the 3D model product 7, the printer 1 prints one printing layer 5 at a time. When printing a printing layer 5, the printer 1 prints one swath 51 at a time.

Figure 4:
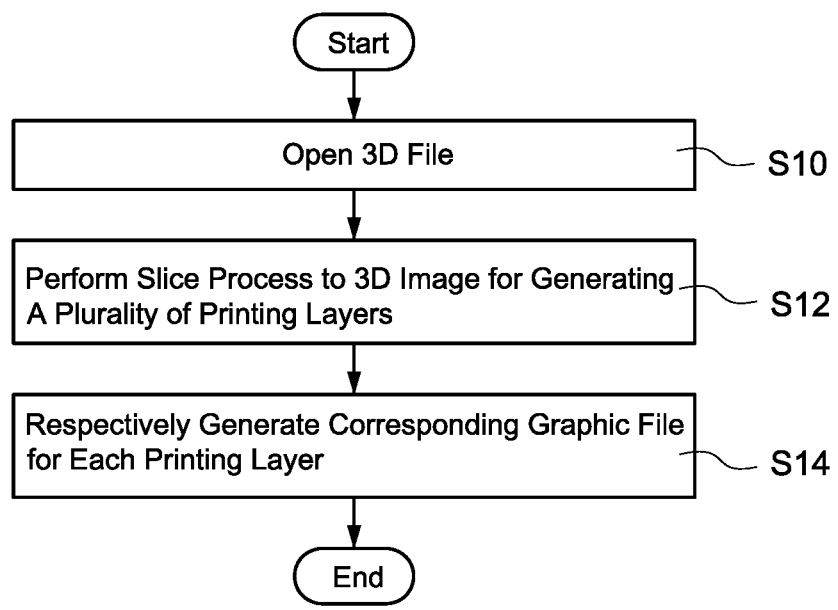
FIG. 4 is a 3D file starting flowchart according to the first disclosed embodiment.

FIG. 4 is a 3D file starting flowchart according to the first disclosed embodiment. As shown in the disclosed embodiment in FIG. 4, the printer 1 firstly opens a 3D file before the printing (step S10), the 3D file for example is a CAD file used for recording a 3D image of the 3D model product 7 which an user is about to print.

After the 3D file is opened, a processor of the printer 1 performs a slice process on the 3D image in order to generate a plurality of printing layers 5 (step S12). Also, the processor further respectively generates a corresponding graphic file for each printing layer 5 (step S14). The slice process is a known technique used in the technical field which is not repeated here.

Generally speaking, when performing the printing, the printer 1 reads one graphic file at a time, and prints the corresponding printing layer 5 according to the content of the graphic file. Also, When the printing of a printing layer 5 is completed, the printer 1 reads next graphic file to print the next printing layer 5 until the printing of all printing layers 5 are completed. In the disclosed embodiments, each printing layer 5 is composed of at least two adjacent and side by side swaths 51, and a seam is generated between two swaths 51 (as the seams 6 shown in FIG. 7).

Figure 5:
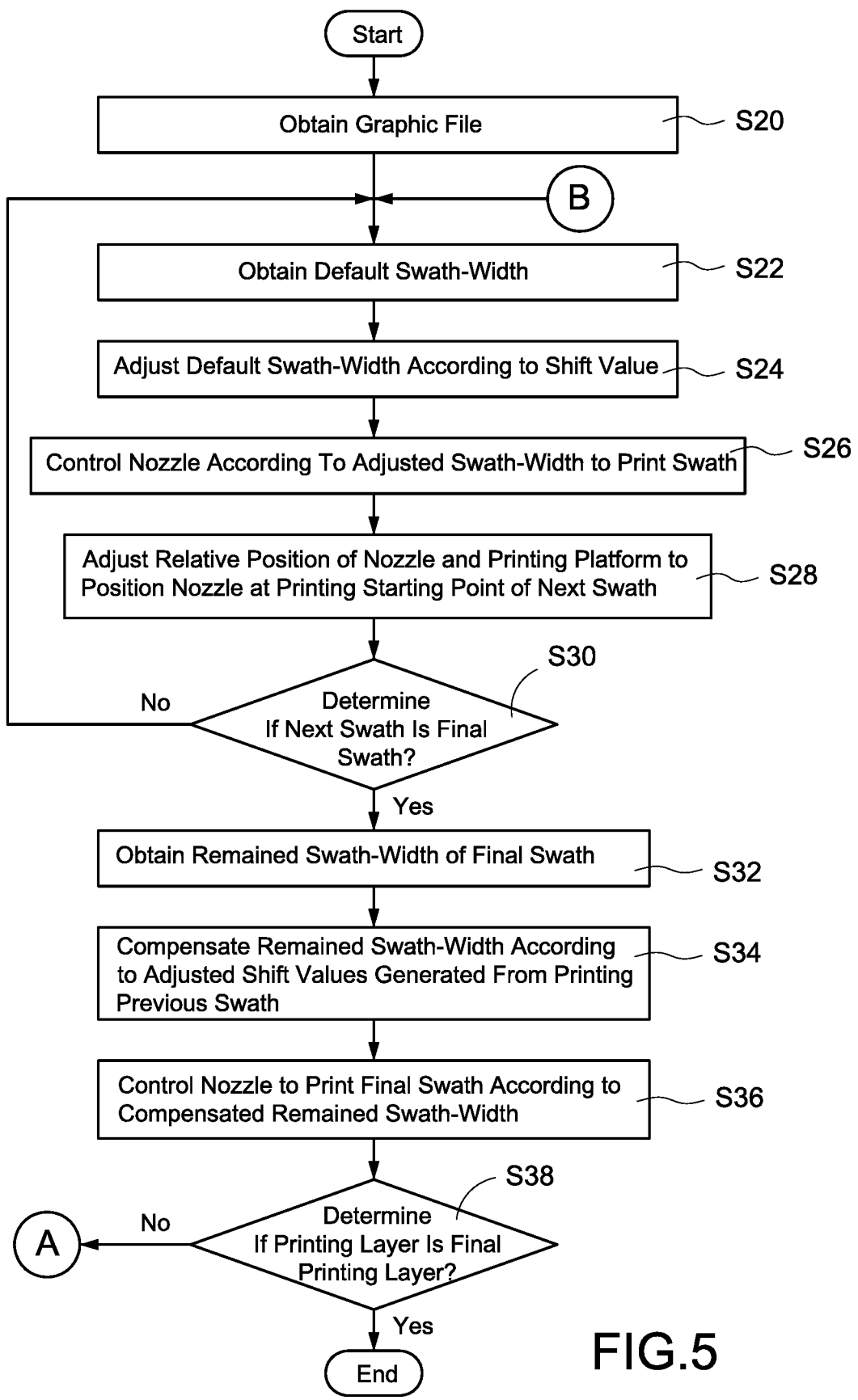
FIG. 5 is the first printing flowchart according to the first disclosed embodiment.
Figure 6:
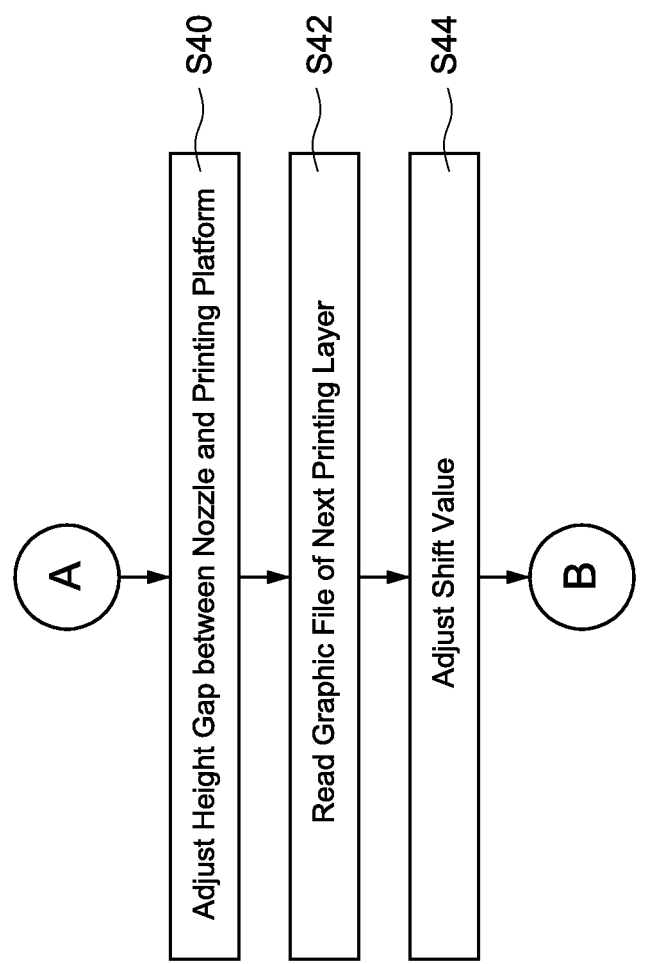
FIG. 6 is the second printing flowchart according to the first disclosed embodiment.

Refer to FIG. 5 and FIG. 6, FIG. 5 is the first printing flowchart according to the first disclosed embodiment and FIG. 6 is the second printing flowchart according to the first disclosed embodiment. When the printer 1 starts to print, the printer 1 first obtains a graphic file to print (step S20), so as to obtains the corresponding image of the printing layer 5 included in the graphic file. Next, the printer 1 obtains a default swath-width (step S22). In one embodiment, the default swath-width in proportion to the width of the nozzle 11, but is not limited thereto.

In the disclosed embodiment, the printer 1 is set with a default shift value. The printer 1 obtains the default swath-width, and adjusts the default swath-width according to the shift value to generate an adjusted swath-width (step S24). After the adjustment, the printer 1 controls the nozzle 11 according to the adjusted swath-width to print the swaths 51 on the printing platform 12 (step S26). Specifically, the printer 1 respectively sets a plurality of different default shift values for a plurality of printing layer 5 to print.

FIG. 7 is a swath top view diagram according to the first disclosed embodiment. In the embodiment shown in FIG. 7, the default value of the swath-width includes 630 pixel dots (i.e., the quantity of a printing dots row, which the nozzle 11 sprays at a time is 630). When printing a first swath 511 of the first printing layer, the printer 1 adjusts the swath-width to include 625 pixel dots, and then the printer 1 prints the first swath 511 according to the adjusted swath-width. In other words, the shift value used in the embodiment is 5 pixel dots.

Specifically, in the embodiment according to the disclosed example, the pixel dots quantity included in the shift values is smaller than the pixel dots quantity included in the swath-width. In the above mentioned step S24, the printer 1 reduces the pixel dots quantity included in the default swath-width according to the shift value. Nonetheless, the above mentioned is one of the disclosed embodiments and the scope of the invention is not limited thereto. In other embodiment, the default swath-width is shorter than the width of the nozzle 11, and the printer 1 increases the pixel dots quantity included in the default swath-width according to the shift value (i.e., increasing the pixel dots quantity included in the default the swath-width to generate the adjusted swath-width). Though, the pixel dots quantity included in the adjusted swath-width may not exceed the pixel dots quantity of the nozzle 11 sprays simultaneously, i.e. the adjusted swath-width must be smaller than or equals to the width of the nozzle 11.

In the above mentioned step S26, the printer 1 controls the nozzle 11 to perform ink jet printing, and controls the nozzle 11 to move towards the X-axis (for example move to the right) in order to print the swath 51 on the printing platform 12. In another embodiment, the printer 1 controls the nozzle 11 to perform ink jet printing, and controls the printing platform 12 to move towards the X-axis (for example move to the left) in order to print the swath 51 on the printing platform 12.

Generally speaking, the printing dots quantity (i.e., the pixel dots quantity) in the swath 51 on the X-axis direction is determined by the moving distance of the nozzle 11 or the printing platform 12 on the X-axis, the printing dots quantity in the swath 51 on the Y-axis is determined by the swath-width (i.e., considering X-axis as a moving axis, and consider Y-axis as a fixed axis). However, in another embodiment, the printer 1 turns the nozzle 11 by 90 degrees, and controls the nozzle 11 or the printing platform 12 to move toward the Y-axis. In the embodiment, the printing dots quantity in the swath 51 on the X-axis direction is determined by the swath-width, and the printing dots quantity in the swath 51 on the y-axis direction is determined by the moving distance of the nozzle 11 or the printing platform 12 on the Y-axis (i.e., considering Y-axis as a moving axis, and consider X-axis as a fixed axis).

As mentioned above, a printing layer 5 is comprised by a plurality of swaths 51 (the operation to print one of the swaths 51 is referred as one shot). After the step S26, the printer 1 completes one shot according to the adjusted swath-width. Next, the printer 1 adjusts the relative position of the nozzle 11 and the printing platform 12 in order to position the nozzle 11 at a printing starting point of the next swath 51 (step S28). In the embodiment according to the disclosed example, each swath on the same printing layer is side by side and adjacent to each other, in step S28, the printer 1 controls the nozzle 11 to move back to a home point of the moving axis, and the printer 1 recognize the width end point of the last swath 51 as the width start point of the next swath 51.

As shown in FIG. 7, the printer 1 first moves the nozzle 11 to the location with coordinates (0,0), and then prints the first swath 511. After that, the printer 1 moves the nozzle to the location with coordinates (0,625), and then print a second swath 512. In the embodiment, the printer 1 considers the X-axis as the moving axis, Y-axis as the fixed axis, "0" as the home point of X-axis, and the adjusted swath-width is 625 pixel dots. As shown in FIG. 7, the second swaths 512 is printed from the width end point of the first swath 511, the seam 6 is generated between the first swath 511 and the second swath 512 (detailed in the following).

In FIG. 5, after the step S28, the printer 1 determines if the next swath 51 to print is a final swath of the current printing layer 5 (as the final swath 513 shown in FIG. 7) (step S30). If the next swath 51 to print is the final swath 513, the printing of the printing layer 5 is completed after the final swath 513 is printed completely.

In step S30, if the printer 1 determines the next swath 51 to print is not the final swath 513 (for example the next swath 51 to print is the second swath 512), the printer 1 re-execute the step S22 to the step S30, in order to adjust the default swath-width via the shift value, and perform second shot with the aforementioned method (i.e., to print the second swath 512).

It should be noted that the printer 1 in the embodiment adjusts the default swath-width of several swaths 51 of the same printing layer 5 according to the same shift value. In other embodiments, the printer 1 is preset with several shift values, or randomly generates different shift values, and the printer 1 respectively adjusts the default swath-width of each swath 51 of the same printing layer 5 according to different shift values. Specifically, the objective of the disclosed example is to stagger the positions of the seams 6 between each two swaths 51 on different printing layers 5. Thus, the printer 1 use the randomly generated shift values to accomplish the same purpose.

In step S30, if the printer 1 determines the next swath 51 to print next is the final swath 513, the printer 1 first obtains a remained swath-width (for example 470 pixel dots shown in FIG. 7) of the final swath 513 (step S32), and compensates the remained swath-width to generated a compensated remained swath-width according to one or several adjusted shift values generated from printing previous one or several swaths 51 (step S34). Lastly, the printer 1 controls the nozzle 11 to print the final swath 513 on the printing platform 12 according to the compensated remained swath-width (step S36). In one of the embodiments, the remained swath width is shorter than the default swath width.

Figure 2:
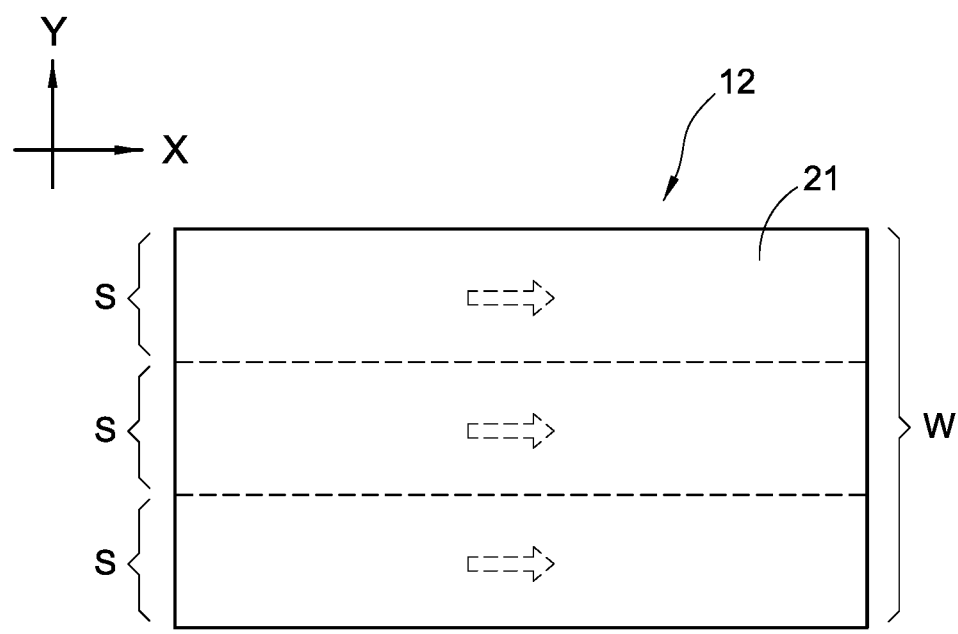
FIG. 2 is a swath top view diagram of the related art 3D printer.
Figure 3:
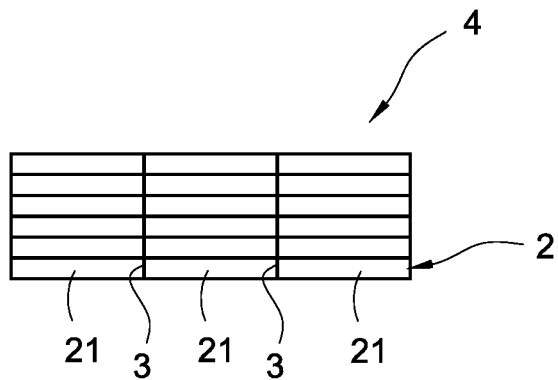
FIG. 3 is a 3D model cross section diagram of the related art 3D printer.

More specifically, the width of the printing platform 12 is fixed (for example the platform width W in FIG. 2). If n swaths 51 (comprise the final swath 513) are required to completely cover the width of the printing platform 12, then the default swath-widths of the n swaths 51 (comprise the remained swath-width of the final swath 513) are all fixed, and the sum of the default swath-widths and the remained swath-width equals to the platform width W of the printing platform 12.

In the embodiment in FIG. 7, the printer 1 requires two standard swaths 51 and one final swath 513 to completely cover the printing platform 12 (i.e., requires three shots), wherein the default swath-widths of the two standard swaths 51 include 630 pixel dots, and the remained swath-width of the final swath 513 include 470 pixel dots. In other words, the platform width W of the printing platform 12 includes 1730 pixel dots (630+630+470).

In an embodiment, the width of the printing platform 12 is about 15 cm, and the width of one pixel dot is about 0.08~0.09 mm. If three shots are completed according to the above mentioned default swath-width, the total width of the three swaths 51 side by side is ((630+630+470)*0.08)~((630+630+470)*0.09), which is about 13.84 mm~15.57 mm, which exactly covers the width of the printing platform 12. Nonetheless, the above mentioned is only an embodiment according to the disclosed example, which is used for explaining the relationship between the swaths 51 and the printing platform 12, but the scope of the invention is not limited to the above mentioned embodiment.

When the printer 1 prints the first printing layer, the shift value is 5 pixel dots, and the swath-widths of the first swath 511 and the second swath 512 both include 625 pixel dots (630−5). In the embodiment, when printing the final swath 513, the printer 1 has to compensate the one or several adjusted shift values (two shift values in the embodiment) generated from printing the swaths 51 in order to completely cover the printing platform 12. It should be noted that, when printing the first swath 511 and the second swath 512, the printer 1 may use different shift values to respectively adjust the swath-widths of the two swaths 511, 512 (preset as 630 pixel dots), and the scope is not limited thereto.

Thus, as shown in FIG. 7, the remained swath-width of the final swath 513 includes 470 pixel dots, however when printing the final swath 513 of the first printing layer, the printer 1 is required to compensate two adjusted shift values (i.e. by 10 pixel dots). Accordingly, the printer 1 first compensates the remained swath-width used by the final swath 513 to include 480 pixel dots (470+5+5), then prints the final swath 513 according to the compensated remained swath-width.

After the step S36, the printer 1 determines if the currently printing layer 5 is a final printing layer of the 3D model product 7 (for example, the final printing layer shown in FIG. 7) (step S38). If the printing layer 5 is the final printing layer, the printing of the 3D model product 7 is completed and the printer 1 terminates the current printing operation.

If the printing layer 5 is not the final printing layer, the printing method moves to the process shown in FIG. 6. The printer 1 adjusts the height gap between the nozzle 11 and the printing platform 12 (step S40), and at the same time reads the graphic file of the next printing layer 5 (for example the second printing layer shown in FIG. 7) (step S42) in order to obtain the image of the next printing layer 5. It should be noted that the step S40 and the step S42 are sequential during the printing method. The printer 1 may first adjust the height gap between the nozzle 11 and the printing platform 12 or first reading the next graphic file, and executing sequence of the two steps is not limited thereto.

Next, the printer 1 adjusts the shift value to generate an adjusted shift value (step S44), and re-executes steps from the step S22 to the step S38 according to the adjusted shifting value to print the next printing layer.

Specifically, as shown in FIG. 7, when printing the second printing layer, the printer 1 adjusts the shift value from 5 pixel dots to 10 pixel dot. Thus, when printing each swath 51 of the second printing layer, the printer 1 adjusts the swath-width of the first swath 511 to include 620 pixel dots (630−10), adjusts the swath-width of the second swath 512 to include 620 pixel dots (630−10), and compensates the remained swath-width of the final swath 513 to include 490 pixel dots (470+10+10). Similarly, the printer 1 may use different shift values to respectively adjust the swath-widths of the two swaths 511, 512.

Additionally, for example, when printing the final printing layer, the printer 1 adjusts the shift value to include 20 pixel dots. Thus, when printing each swath 51 of the final printing layer, the printer 1 adjusts the swath-width of the first swath 511 to include 610 pixel dots (630–20), adjusts the swath-width of the second swath 512 to include 610 pixel dots (630–20), and compensates the remained swath-width of the final swath 513 to include 510 pixel dots (470+20+20).

In the above mentioned embodiments, the printer 1 adjusts the shift values via increasing the pixel dots quantity included in the shift values. However, in other embodiments, the printer 1 may adjust the shift values via reducing the pixel dots quantity included in the shift values, and the scope of the invention is not limited thereto.

In an embodiment, the printer 1 uses different shift values to adjust the default swath-width when printing each of the printing layers 5. However, the 3D model product 7 is formed by a large quantity of the printing layers 5 (for example 5000 layers, 8000 layers etc.). Accordingly, in another embodiment, the printer 1 adjusts the shift values via means of multi-recursion.

for example, the printer 1 uses a first shift value (for example includes 5 pixel dots) to adjust the swath-width of each swath in the first printing layer, uses a second shift value (for example includes 10 pixel dots) to adjust the swath-width of each swath in the second printing layer, uses a third shift value (for example includes 15 pixel dots) to adjust to adjust the swath-width of each swath in the third printing layer. When printing the fourth layer, the printer 1 re-uses the first shift value to adjust the swath-width of each swath in the fourth printing layer, and so on.

It should be noted that, when printing each of the printing layer 5, the printer 1 compensates a remained swath-width of the final swath 513 according to the previously adjusted shift values, and as long as the compensated remained swath-width does not exceed the width of the nozzle 11, the compensated remained swath-width is supported by the printer 1. However, if the compensated remained swath-width exceeds the width of the nozzle 11 (for example, the compensated remained swath-width is compensated from 470 pixel dots to include 650 pixel dots but the width of the nozzle 11 only covers 640 pixel dots), the printer 1 further divides the final swath 513 into two swaths (a swath including 630 pixel dots and a final swath including 20 pixel dots). Next, the printer 1 respectively adjusts/compensates the swath-widths of the two swaths, and prints the two swaths in turn.

Figure 8:
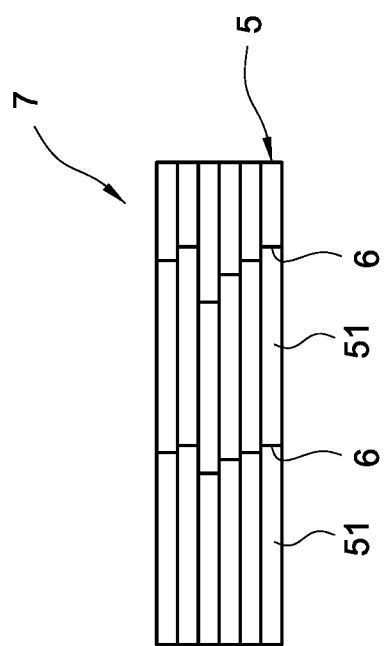
FIG. 8 is a 3D model cross section diagram according to the first disclosed embodiment.

FIG. 8 is a 3D model cross section diagram according to the first disclosed embodiment. As mentioned above, the 3D model product 7 is stacked by a plurality of printing layers 5 (the thickness of each printing layer 5 is about 0.013 mm depending on the specification of the nozzle 11), each printing layer 5 is respectively comprised of multiple swaths 51, wherein each printing layer 5 comprises a final swath 513.

As mentioned above, a seam 6 is generated between two side by side and adjacent swaths 51 and also between one of the swaths 51 and the adjacent final swath 513. Due to the disclosed embodiments of the present invention, the swaths 51 of each stacked printing layer 5 respectively comprise different swath-widths.

Specifically, in the 3D model product 7 shown in FIG. 8, the positions of the seams 6 on each printing layer 5 are staggered. The positions of the seams 6 on different printing layers 5 in the 3D model product 7 are staggered via the printing method according to the disclosed example. Accordingly, when the 3D model product 7 is squeezed by external force, the 3D model product 7 is not cracked along the seams 6. Thus, the strength of the 3D model product 7 is enhanced.

Figure 9:
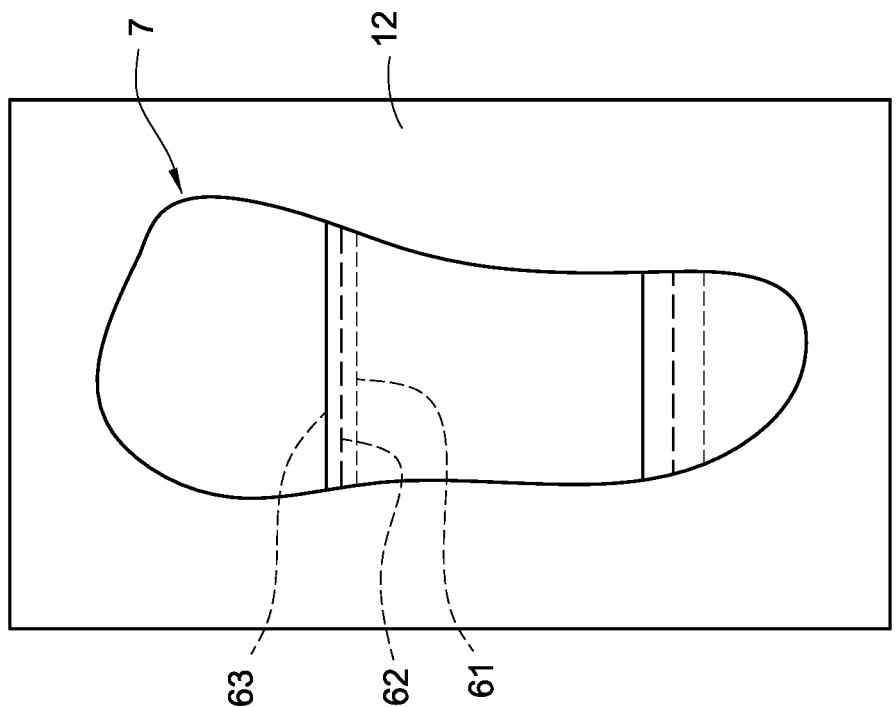
FIG. 9 is a 3D model top view diagram according to the first disclosed embodiment.

FIG. 9 is a 3D model top view diagram according to the first disclosed embodiment. A shoe is used as an example in the 3D model product 7 shown in FIG. 9. Specifically, the nozzle 11 sprays a row of printing dots to print by swath, and only when the nozzle 11 moves to corresponding positions of the 3D model product 7, the printer 1 controls the nozzle 11 to perform ink jet printing. Accordingly, the printer 1 prints a 3D model product 7 of any shape via the printing method according to the disclosed example.

In the embodiment in FIG. 9, the first kind of the dotted lines refers to a first seam 61 between swaths of the first printing layer in the 3D model product 7, the second kind of dotted lines refers to a second seam 62 between swaths of the second printing layer in the 3D model product 7, and the solid line refers to a third seam 63 between swaths of the third printing layer in the 3D model product 7, In FIG. 9, the swath-width of each printing layer is adjusted via the shift values, it turns out the seams 61-63 of different printing layers in the printed 3D model product 7 are staggered. Accordingly, the strength of the 3D model product 7 is effectively enhanced so that when the 3D model product 7 is squeezed by external force, the 3D model product 7 is not cracked along the seams.

As the skilled person will appreciate, various changes and modifications can be made to the described embodiment. It is intended to include all such variations, modifications and equivalents which fall within the scope of the present invention, as defined in the accompanying claims.

What is claimed is:

1. A 3D printing method implemented by swaths used in a 3D printer, the 3D printer comprising a nozzle and a printing platform, the 3D printing method comprising:
   a) obtaining a default value of a swath-width;
   b) adjusting the default value of the swath-width based on a shift value to generate an adjusted swath-width;
   c) controls the nozzle to print a swath of a printing layer on the printing platform according to the adjusted swath-width;
   d) adjusting the relative position of the nozzle and the printing platform to position the nozzle at a printing starting point of a next swath after the step c;
   e) determining if the next swath is a final swath of the printing layer;
   f) repeating executing from the step a to the step e if the next swath is not the final swath;
   g) compensating a remained swath-width of the final swath according to the adjusted shift value generated from printing the previous swath to generate a compensated remained swath-width if the next swath is the final swath, wherein the remained swath-width is shorter than the default value of the swath-width;
   h) controlling the nozzle to print the final swath on the printing platform according to the compensated remained swath-width; and
   i) changing the shift value, and performing a printing action for a next printing layer according to the changed shift value.

2. The 3D printing method implemented by swaths of claim 1, wherein the step f is executing from the step a to the step e after adjusting the shift value.

3. The 3D printing method implemented by swaths of claim 1, wherein the printing platform is configured with a platform width, and a sum of the swath-width of all printed swaths and the remained swath-width of the final swath equals to the platform width.

4. The 3D printing method implemented by swaths of claim 1, wherein the step c and the step h are controlling the nozzle to perform ink jet printing and move towards an X-axis of the 3D printer to print the swaths and the final swath.

5. The 3D printing method implemented by swaths of claim 1, wherein the step c and the step h are controlling the nozzle to perform ink jet printing and controlling the printing platform to move towards an X-axis of the 3D printer to print the swaths and the final swath.

6. The 3D printing method implemented by swaths of claim 1, wherein the pixel dots quantity included in the shift value is smaller than another pixel dots quantity included in the swath-width, the step b is reducing the pixel dots quantity included in the default value of the swath-width according to the shift value to generate the adjusted swath-width.

7. The 3D printing method implemented by swaths of claim 1, wherein the default value of the swath-width equals to the width of the nozzle.

8. The 3D printing method implemented by swaths of claim 1, wherein the default value of the swath-width is shorter than the width of the nozzle; the step b is increasing or reducing the default value of the swath-width according to the shift value to generate the adjusted swath-width, the step g is increasing or reducing the remained swath-width according to the adjusted shift value to generate the compensated remained swath-width, and the adjusted swath-width and the compensated remained swath-width are shorter than or equal to the width of the nozzle.

9. The 3D printing method implemented by swaths of claim 1, wherein the step a further comprising a step: a0) reading a graphic file, wherein the graphic file records the printing layer of a 3D model, and the printing layer is comprised of the swaths and the final swath.

10. The 3D printing method implemented by swaths of claim 9, wherein the 3D model comprises a plurality of the printing layers, each printing layer respectively is comprised of a swath and a final swath, and the swaths of each of the printing layers respectively comprise different swath-widths.

11. The 3D printing method implemented by swaths of claim 9, wherein the step i comprises:
  i1) determining if the printing layer is a final printing layer of the 3D model;
  i2) adjusting a height gap between the nozzle and the printing platform and reading the graphic file of the next printing layer if the printing layer is not the final printing layer;
  i3) adjusting the shift value to generate an adjusted shift value, and re-executing steps from the step a to the step h according to the adjusted shifting value to print the next printing layer; and
  i4) ending the printing of the 3D model if the printing layer is the final printing layer.

12. The 3D printing method implemented by swaths of claim 11, wherein the step i3 is increasing or decreasing the pixel dot quantity included in the shift value.

13. A 3D printing method implemented by swaths used in a 3D printer, the 3D printer comprising a nozzle and a printing platform, the 3D printing method comprising:
  a) obtaining a default value of a swath-width;
  b) adjusting the default value of the swath-width based on a shift value to generate an adjusted swath-width;
  c) controls the nozzle to print a swath on the printing platform according to the adjusted swath-width;
  d) adjusting the relative position of the nozzle and the printing platform to position the nozzle at a printing starting point of a next swath after the step c;
  e) determining if the next swath is a final swath;
  f) repeating executing from the step a to the step e if the next swath is not the final swath;
  g) compensating a remained swath-width of the final swath according to the adjusted shift value generated from printing the previous swath to generate a compensated remained swath-width if the next swath is the final swath, wherein the remained swath-width is shorter than the default value of the swath-width; and
  h) controlling the nozzle to print the final swath on the printing platform according to the compensated remained swath-width,
  wherein the default value of the swath-width equals to the width of the nozzle.

* * * * *